(12) United States Patent
Cui et al.

(10) Patent No.: US 12,069,523 B2
(45) Date of Patent: Aug. 20, 2024

(54) METHODS AND APPARATUS FOR MEASUREMENT GAP ACTIVATION AND DEACTIVATION FOR POSITIONING MEASUREMENTS

(71) Applicant: Apple Inc., Cupertino, CA (US)

(72) Inventors: Jie Cui, Cupertino, CA (US); Fangli Xu, Beijing (CN); Dawei Zhang, Cupertino, CA (US); Hong He, Cupertino, CA (US); Murtaza A. Shikari, Cupertino, CA (US); Yang Tang, Cupertino, CA (US); Yuchul Kim, Cupertino, CA (US); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/598,206

(22) PCT Filed: Apr. 8, 2020

(86) PCT No.: PCT/CN2020/083782
§ 371 (c)(1),
(2) Date: Sep. 24, 2021

(87) PCT Pub. No.: WO2021/203307
PCT Pub. Date: Oct. 14, 2021

(65) Prior Publication Data
US 2023/0025902 A1 Jan. 26, 2023

(51) Int. Cl.
*H04W 36/00* (2009.01)
*H04L 5/00* (2006.01)
(Continued)

(52) U.S. Cl.
CPC ....... *H04W 36/0088* (2013.01); *H04L 5/0048* (2013.01); *H04W 72/0446* (2013.01); *H04W 72/51* (2023.01); *H04W 64/003* (2013.01)

(58) Field of Classification Search
None
See application file for complete search history.

(56) References Cited

U.S. PATENT DOCUMENTS

| 2012/0184290 A1* | 7/2012 | Kazmi ................. H04W 64/00 455/456.1 |
| 2012/0307670 A1 | 12/2012 | Kazmi et al. |

(Continued)

FOREIGN PATENT DOCUMENTS

| CA | 3069741 A1 | 2/2019 |
| WO | WO-2012177203 A1 * | 12/2012 ............ H04W 24/02 |

(Continued)

OTHER PUBLICATIONS

Ericsson: "On measurement gaps for dense PRS", 3GPP Draft; R4-1806191 On Measurements Gaps For Dense PRS_V2, 3rd Generation Partnership Projects (3GPP), Mobile Competence Centre; vol. RAN WG4, No. Busan, Republic of Korea; May 21, 2018-May 25, 2018 May 20, 2018, XP051445891.

(Continued)

*Primary Examiner* — Walter J Divito
(74) *Attorney, Agent, or Firm* — Womble Bond Dickinson (US) LLP

(57) ABSTRACT

Methods and apparatus are disclosed for a UE and its serving base station to coordinate the activation and deactivation of measurement gaps for performing positioning measurements by the UE using target positioning reference signals (PRS) during bandwidth part (BWP) switching. The UE may be configured by the serving base station to have dedicated measurement gaps. The UE determines if a legacy measurement gap used for mobility measurements or a scheduled data transmission collides with the dedicated measurement gaps. If there is a collision, the UE performs the mobility measurement using the legacy measurement gap or transmits the scheduled data. If there is no collision, the UE receives (Continued)

the PRS to perform the positioning measurement during the dedicated measurement gaps. In one embodiment, based on the status of the active BWP and the target PRS, the UE or the base station may activate or deactivate measurement gaps for the positioning measurements.

18 Claims, 14 Drawing Sheets

(51) Int. Cl.
  *H04W 64/00* (2009.01)
  *H04W 72/0446* (2023.01)
  *H04W 72/51* (2023.01)

(56) References Cited

U.S. PATENT DOCUMENTS

| | | |
|---|---|---|
| 2018/0020423 A1 | 1/2018 | Wang et al. |
| 2019/0274146 A1* | 9/2019 | Tang .................... H04W 24/10 |
| 2020/0022167 A1 | 1/2020 | Manolakos et al. |

FOREIGN PATENT DOCUMENTS

| | | |
|---|---|---|
| WO | 2017/200708 A1 | 11/2017 |
| WO | 2019/162513 A1 | 8/2019 |
| WO | 2019/212246 A1 | 11/2019 |

OTHER PUBLICATIONS

European Search Report and Search Opinion received for European Application No. 20929886.8, mailed on Dec. 19, 2023, 8 pages.
International Preliminary Report on Patentability received for PCT Patent Application No. PCT/CN2020/083782, mailed on Oct. 20, 2022, 6 pages.
International Search Report and Written Opinion received for PCT Patent Application No. PCT/CN2020/083782, mailed on Jan. 4, 2021, 8 pages.
LG Electronics. "Discussions on Possible Techniques for NR Positioning" 3GPP TSG RAN WGJ Meeting #95 R1-1812595, Nov. 16, 2018.

* cited by examiner

METHODS AND APPARATUS FOR MEASUREMENT GAP ACTIVATION AND DEACTIVATION FOR POSITIONING MEASUREMENTS

RELATED APPLICATIONS

The present application is the national phase of International Application No. PCT/CN2020/083782, filed on Apr. 8, 2020 and the disclosure of which is hereby incorporated herein by reference in its entirety.

FIELD

This disclosure relates to the field of wireless communication, and more specifically, to methods that enable wireless communication devices to activate and deactivate measurement gaps for positioning measurements. Other aspects are also e

BACKGROUND

Wireless communication networks such as the 5G new radio (NR) systems and 4G Long Term Evolution (LTE) support positioning determination of user equipment (UE) using observed time difference of arrival (OTDOA) mechanism. OTDOA is a multilateration method in which the UE measures the time of arrival (TOA) of positioning reference signals (PRS) received from multiple base stations (e.g., eNodeB in LTE or gNodeB in NR). The difference in the TOAs from several neighboring and geographically dispersed base stations with good geometry are used to solve for the coordinates of the UE based on knowledge of the locations of the base stations. The multiple base stations may operate and transmit their PRS on different frequency bands, also referred to as frequency layers. When the UE needs to make a TOA measurement of the PRS from a neighboring base station operating on a different frequency layer from that of its serving base station, the UE may request a measurement gap from the serving base station using radio resource control (RRC) signaling. The serving base station may configure the measurement gap so no signal transmission or reception happens at the UE during the positioning subframes when the UE receives the PRS from the neighboring base station. The UE may use the transmission gap to switch its radio frequency (RF) receiver to the frequency layer of the neighboring base station to receive the PRS to perform the TOA measurement and then switch the RF receiver back to the frequency layer of the serving base station.

Conventionally, a positioning server may request the UE to perform the TOA measurement, also referred to as positioning measurement, by delivering assistance data to the UE via higher layer signaling. The serving base station may not have knowledge of the frequency layers used by the neighboring base stations to transmit the PRS when the UE performs the positioning measurement. Hence, the UE may request the serving base station to configure the measurement gap via RRC based on the current frequency layer or active bandwidth part (BWP) of the serving base station and frequency layer information of the neighboring base stations. Sometimes, the serving base station may switch the BWP to a different frequency layer. The serving base station may signal BWP switching to the UE using physical (PHY) indication such as using downlink control information (DCI). However, the BWP switching activity may be much faster than the ability of the UE to respond via RRC to request the serving base station to configure the measurement gap. When the UE is not configured with the gap measurement as fast as the BWP switching, the UE may not be able to receive the PRS from a neighboring base station operating on a different frequency layer from the BWP of the serving base station, potentially causing a failure of the positioning measurement. There is a need to improve the configuration of measurement gaps used by the UE for positioning measurements when there is BWP switching by the serving base station.

SUMMARY

A method for a UE and a serving base station of a wireless communication network to activate and deactivate measurement gaps used by the UE for positioning measurement using PRS is disclosed. The method includes the UE receiving from the serving base station configuration information used to configure dedicated measurement gaps for the positioning measurements. The method also includes the UE determining if a scheduled reception window or a scheduled transmission window collides with one of the dedicated measurement gaps. If there is a collision, the UE skips the positioning measurement during the dedicated measurement gap. If there is no collision, the UE receives the PRS to perform the positioning measurement during the dedicated measurement gap. The scheduled reception window may include a measurement gap used for mobility measurement. The scheduled transmission window may include transmitting data or a sounding reference signal (SRS).

A method for a UE and a serving base station of a wireless communication network to activate and deactivate measurement gaps used by the UE for positioning measurement using PRS is disclosed. The method includes the UE transmitting information about the PRS to the base station. The method also includes the UE receiving from the serving base station configuration information used to configure measurement gaps for the positioning measurements. The method further includes the UE receiving from the serving base station an activation signal for the measurement gaps. In response to the activation signal, the UE receives the PRS to perform the positioning measurements during the dedicated measurement gaps. The activation signal indicates that the frequency layer of the base station does not contain the PRS.

A method for a UE and a serving base station of a wireless communication network to activate and deactivate measurement gaps used by the UE for positioning measurement using PRS is disclosed. The method includes the UE transmitting to the base station a request for the measurement gaps. The method also includes the UE receiving from the serving base station configuration information used to configure measurement gaps for the positioning measurements. The method further includes the UE transmitting to the base station an activation signal for the measurement gaps. The UE then receives the PRS to perform the positioning measurements during the dedicated measurement gaps. The activation signal indicates that the frequency layer of the base station does not contain the PRS.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
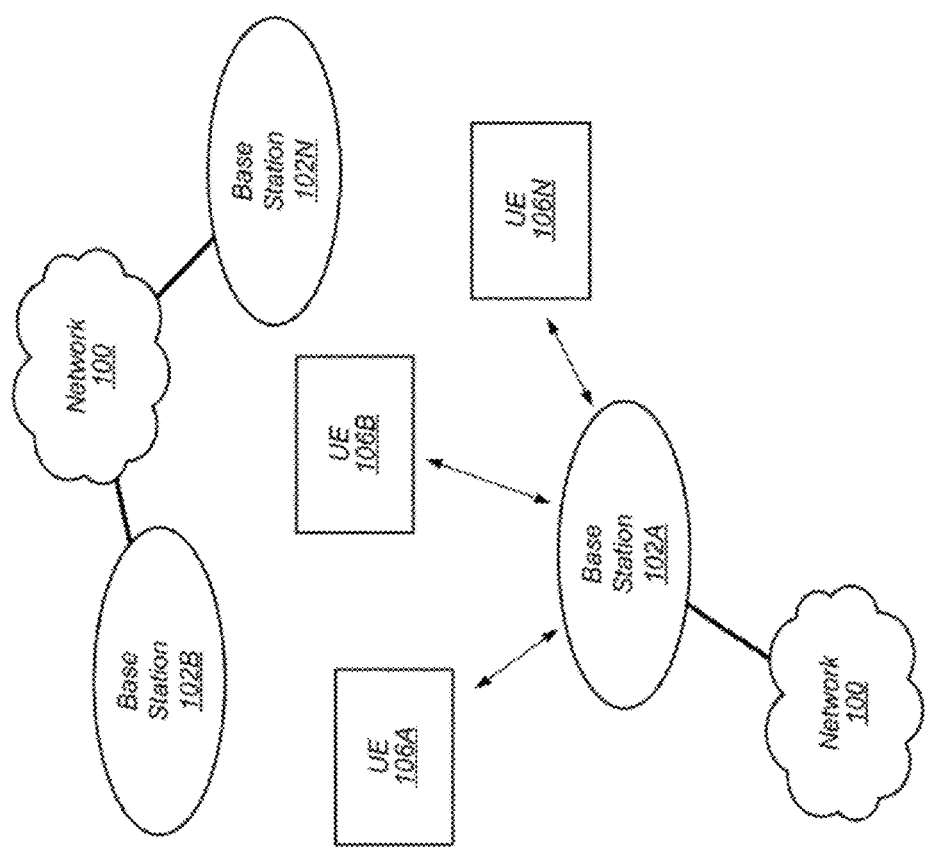
FIG. 1 illustrates an example wireless communication system according to some embodiments of the disclosure.

It is desirable to improve the configuration of measurement gaps used by the UE for positioning measurements when there is BWP switching. For the UE to make the positioning measurement using the target PRS from a target base station such as a gNodeB or gNB in 5G new radio (5G NR) that operates on a different frequency layer from the active BWP of the serving gNB, the UE may request a measurement gap from the serving gNB. The serving gNB may configure the measurement gap so no signal transmission or reception occurs during the positioning subframes when the UE receives the target PRS from the target gNB. The UE may use the transmission gap to switch its RF receiver to the frequency layer of the target gNB to receive the target PRS to perform the positioning measurement and then switch the RF receiver back to the active BWP of the serving gNB. On the other hand, when the target PRS is contained in the active BWP, no measurement gaps are necessary for the UE to receive the target PRS. When the serving gNB switches the active BWP, the serving gNB may not have all the information on whether the target PRS is contained in the new active BWP to determine whether measurement gaps are needed. Disclosed are methods for the UE and the serving gNB to coordinate the activation and deactivation of measurement gaps for performing positioning measurements using target PRS during BWP switching when the target PRS may be contained within or cast outside of the active BWP. The embodiments of the disclosure are illustrated using the gNB of 5G NR as the serving base station. However, features of the disclosure may be implemented by the eNodeB of the 4G LTE system or the base stations or access points of other types of wireless networks.

In one embodiment, the UE may request measurement gaps to cover target PRS measurement regardless of whether the target PRS is contained within the active BWP or not. The serving gNB may configure the measurement gaps regardless of the active BWP status of the UE and may not transmit during the measurement gaps even when the PRS is contained within the active BWP.

In one embodiment, dedicated measurement gaps for positioning measurements by the UE may be configured by the serving gNB. The UE may perform the positioning measurement using the target PRS within the dedicated measurement gaps. When a dedicated measurement gap collides with a legacy measurement gap for mobility measurement, the mobility measurement is prioritized and the positioning measurement gap is muted. When a dedicated measurement gap collides with scheduled data or sounding reference signal (SRS) transmissions, the data or SRS transmission is prioritized and the positioning measurement gap is also muted.

In one embodiment, based on the current status of the active BWP and target PRS, the UE may request activation or deactivation of measurement gaps from the serving gNB for positioning measurements. The UE may request the activation or deactivation of the measurement gaps using PHY signaling or media-access-control control element (MAC CE) signaling. For example, if the active BWP does not contain the target PRS, the UE may request activation of the measurement gaps. If the serving gNB switches the active BWP and the new active BWP contains the target PRS, the UE may request deactivation of the measurement gaps.

In one embodiment, the UE may provide PRS information to the serving gNB for the serving gNB to activate or deactivate the measurement gaps for the UE. The serving gNB may indicate the activation or deactivation of the measurement gaps to the UE using PHY signaling or MAC CE signaling. For example, if the active BWP does not contain the target PRS, the serving gNB may activate the measurement gaps. If the serving gNB switches the active BWP and the new active BWP contains the target PRS, the serving gNB may deactivate the measurement gaps.

In one embodiment, the UE may provide PRS information to the serving gNB via RRC. The serving gNB may perform an initial measurement gap configuration for positioning measurements using the target PRS regardless of whether the active BWP contains the target PRS. After the initial configuration, the serving gNB may check if the active BWP contains the target PRS to determine whether to expect the UE to use the measurement gaps for positioning measurements. For example, if the active BWP contains the target PRS, the serving gNB does not expect the UE to use the measurement gaps for positioning measurements. On the other hand, if the active BWP does not contain the target PRS, the serving gNB expects the UE to use the measurements gaps. The UE may independently evaluate if the BWP contains the target PRS to determine whether to use the measurement gaps for positioning measurements.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB.'

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible. A UE 106 may measure the time of arrival (TOA) of positioning reference signals (PRS) transmitted by its serving base station 102A and by base stations 102B-N of the neighboring cells to support position determination of UE 106.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
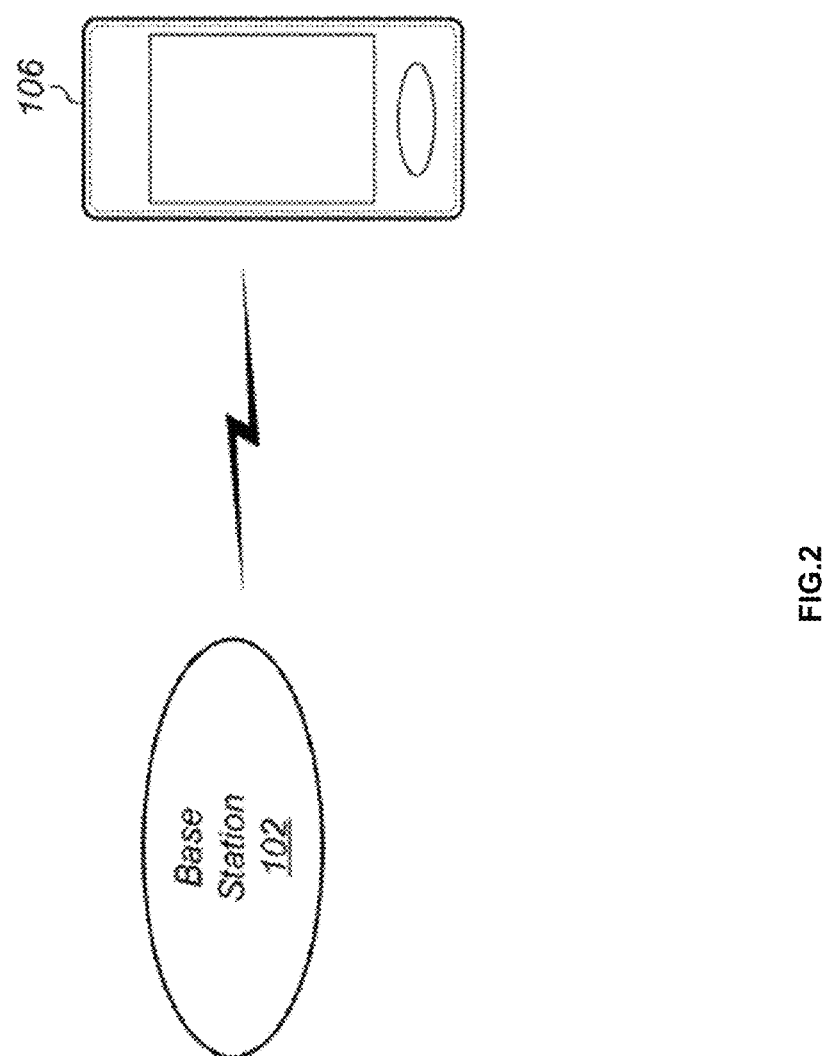
FIG. 2 illustrates a base station (BS) in communication with a user equipment (UE) device according to some embodiments of the disclosure.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE or 5G NR using a single shared radio and/or GSM or LTE or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
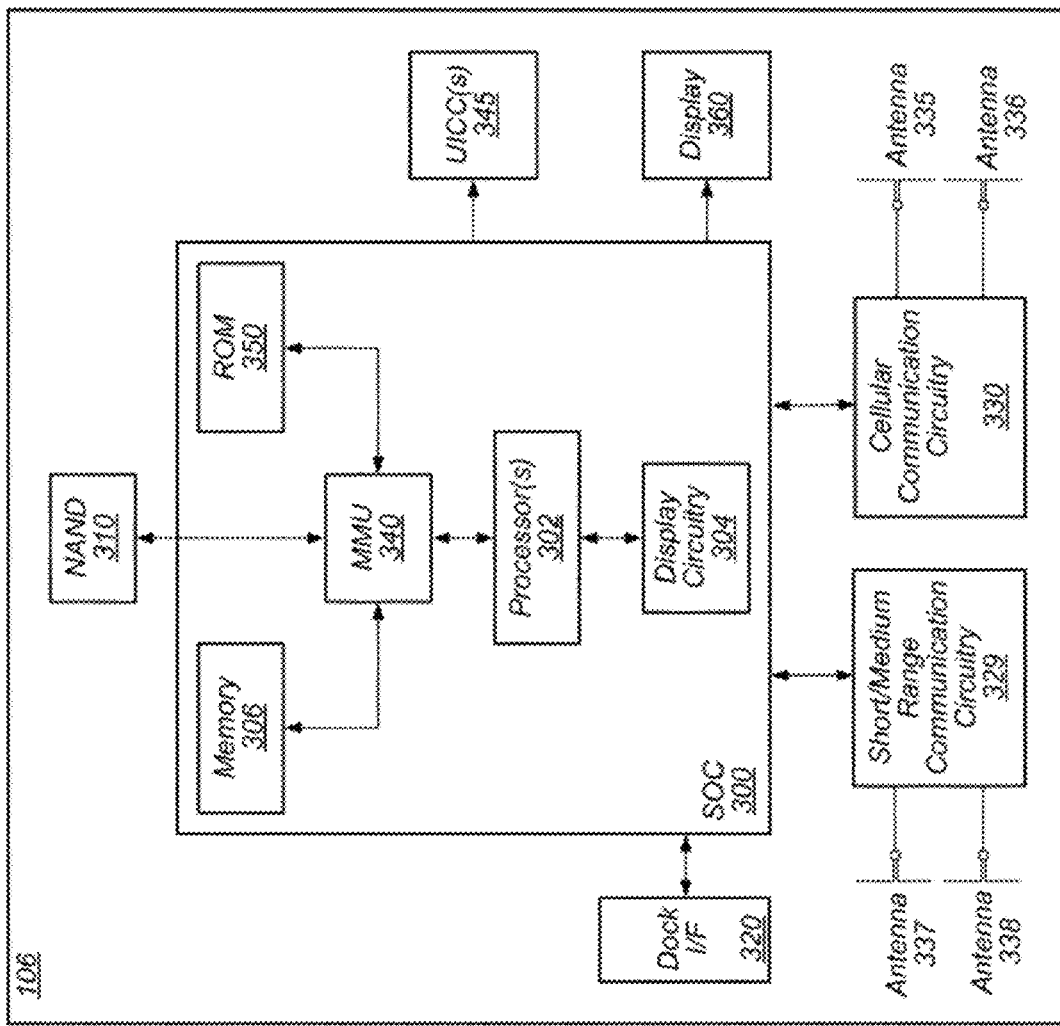
FIG. 3 illustrates an example block diagram of a UE accordance to some embodiments of the disclosure.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA (Non-Standalone) NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
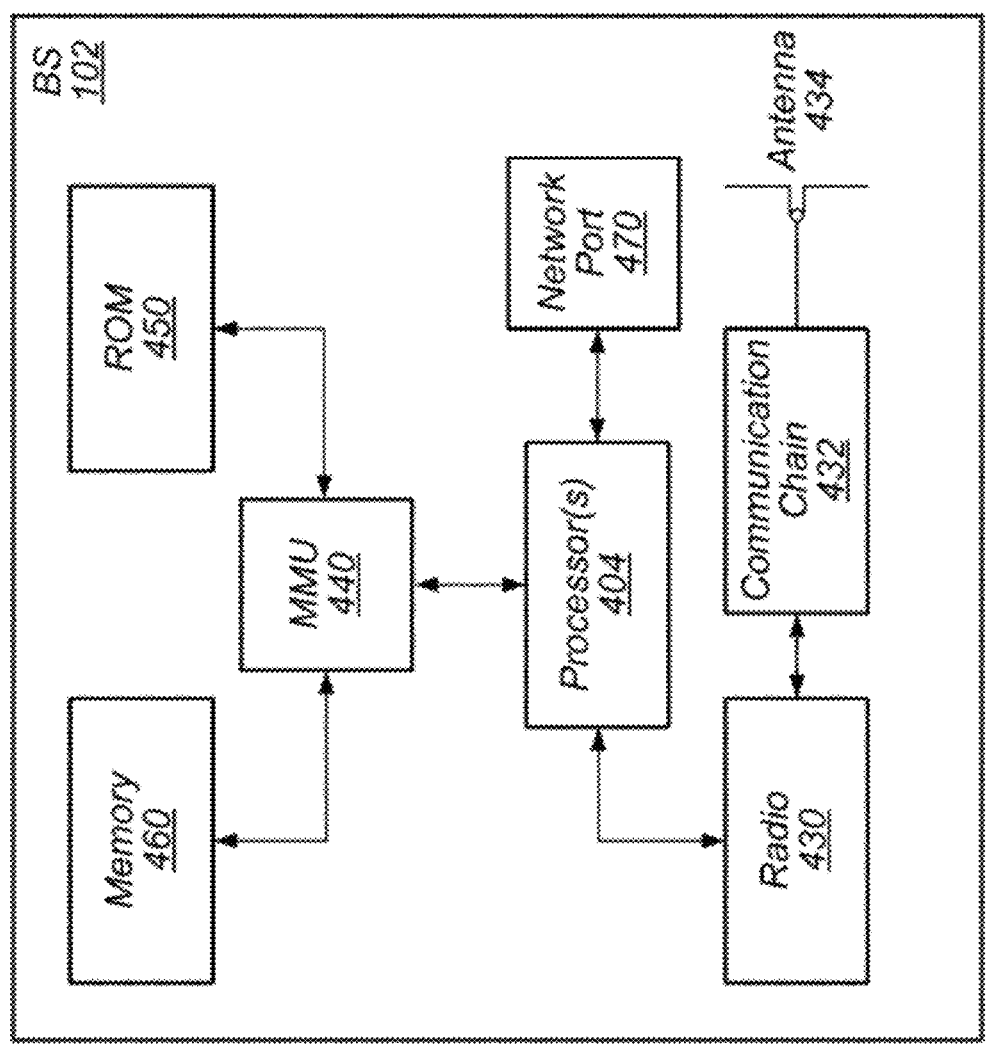
FIG. 4 illustrates an example block diagram of a BS in accordance to some embodiments of the disclosure.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs).

In addition, a UE capable of operating according to 5G NR may be connected to one or more TRPs within one or more gNB's.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
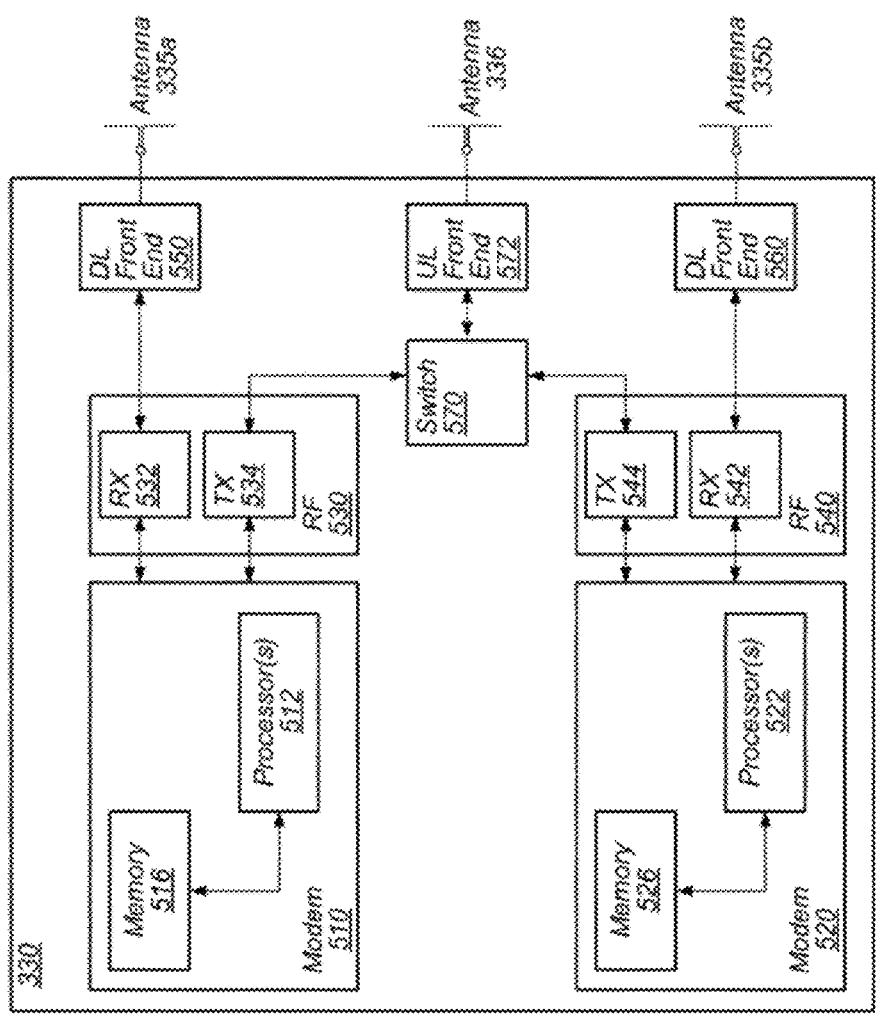
FIG. 5 illustrates an example block diagram of cellular communication circuitry accordance to some embodiments of the disclosure.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335 a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335 b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
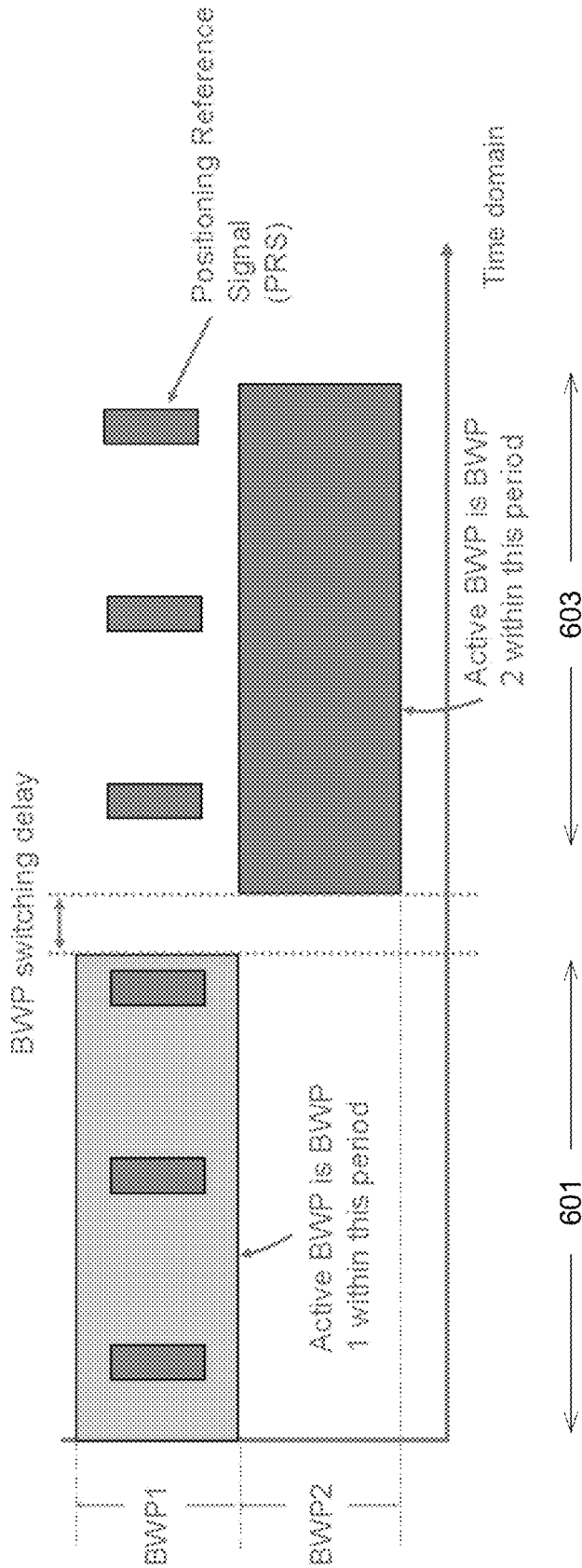
FIG. 6 illustrates BWP switching in which the measurement gap may not be configured fast enough for a UE to receive PRS for positioning measurement when the active BWP switches from BWP1 that contains the PRS to BWP2 that does not contain the PRS accordance to some embodiments of the disclosure.
Figure 7:
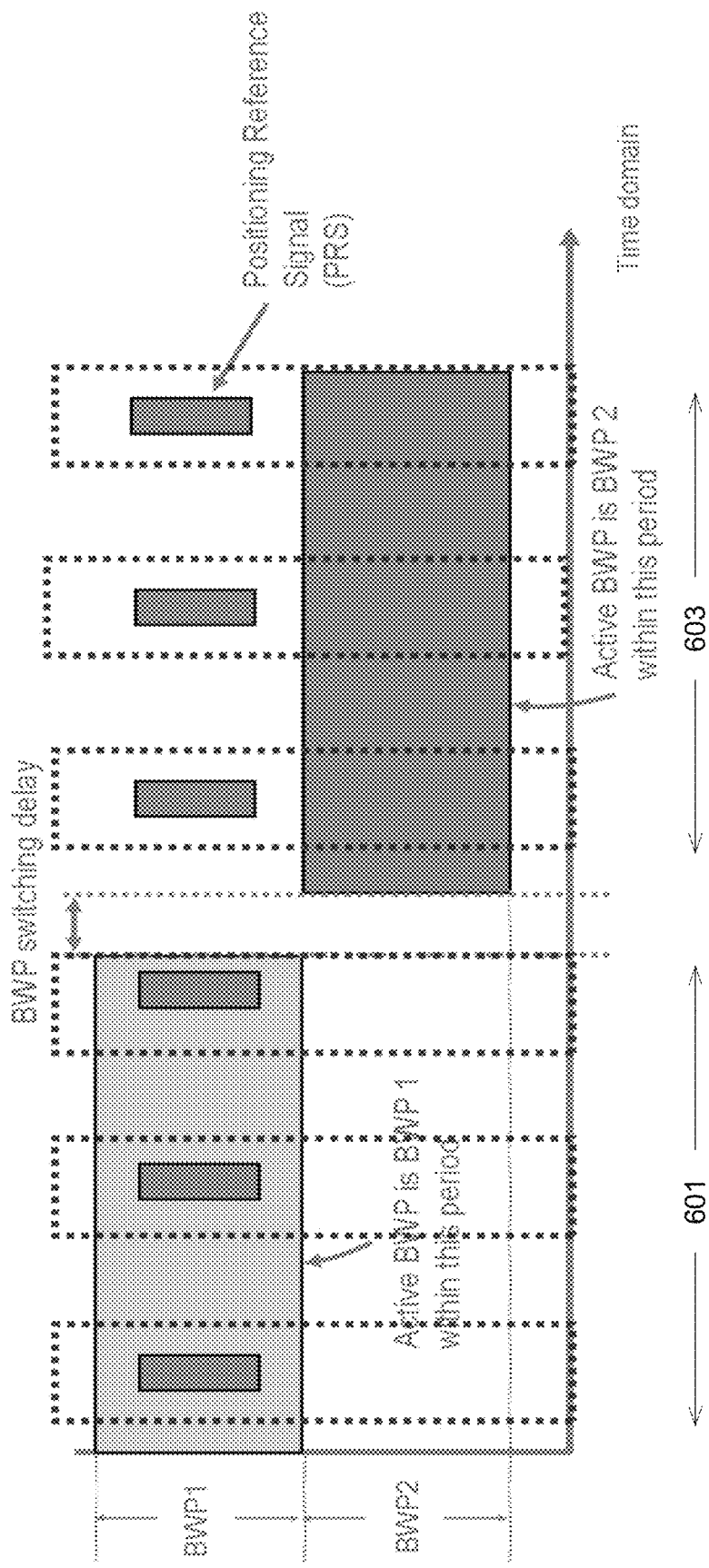
FIG. 7 illustrates a method for the UE to request measurement gaps to cover PRS measurement regardless of whether the active BWP contains the PRS in accordance to some embodiments of the disclosure.

FIG. 6 illustrates BWP switching in which the measurement gap may not be configured fast enough for a UE, such as UE 106 of FIG. 1, to receive PRS for positioning measurement when the active BWP switches from BWP1 that contains the PRS to BWP2 that does not contain the PRS according to some embodiments. The serving gNB, such as base station 102A of FIG. 1, may switch the active BWP. The serving base station may signal BWP switching to the UE using PHY indication such as using DCI. However, the BWP switching activity may be much faster than the speed at which the UE is able to request the serving gNB to configure the measurement gaps using RRC. As shown, within first period 601 the active BWP is BWP1 and BWP1 contains the frequency domain resource elements (RE) or resource blocks of the target PRS. This situation may be referred to as the active BWP containing the target PRS. The UE does not need the measurement gaps to perform the positioning measurements. However, if the serving gNB changes the active BWP for the UE to BWP2 in second period 603, BWP2 no longer contains the target PRS for positioning measurements. The UE may need to request the measurement gaps. Using the RRC signaling, the UE may be unable to request the serving gNB to configure the measurement gaps fast enough, potentially causing a failure of the positioning measurements. The following discloses methods for the UE and the serving gNB to coordinate the activation and deactivation of measurement gaps for the UE to perform positioning measurements using the target PRS during BWP switching when the target PRS may be contained within or cast outside of the active BWP FIG. 7 illustrates a method for the UE to request measurement gaps to cover PRS measurement regardless of whether the active BWP contains the PRS according to some embodiments of the disclosure. The UE may provide the PRS time/frequency information, such as the frequency domain RE or resource blocks of the target PRS, to the serving gNB. In one embodiment, the PRS time/frequency information may be derived from assistance data received by the UE from a positioning server.

The serving gNB may configure the measurement gaps regardless of the active BWP Status of target UE. For example, the serving gNB may configure the measurement gaps even during first period 601 when the BWP1 contains the target PRS. The UE may conduct positioning measurement within all measurement gap occasions even though the target PRS is within its active BWP, such as BWP1 during first period 601, and no data reception or transmission is allowed during those positioning measurement occasions. As shown, the target PRS is covered by the configured measurement gaps regardless of the active BWP.

Figure 8:
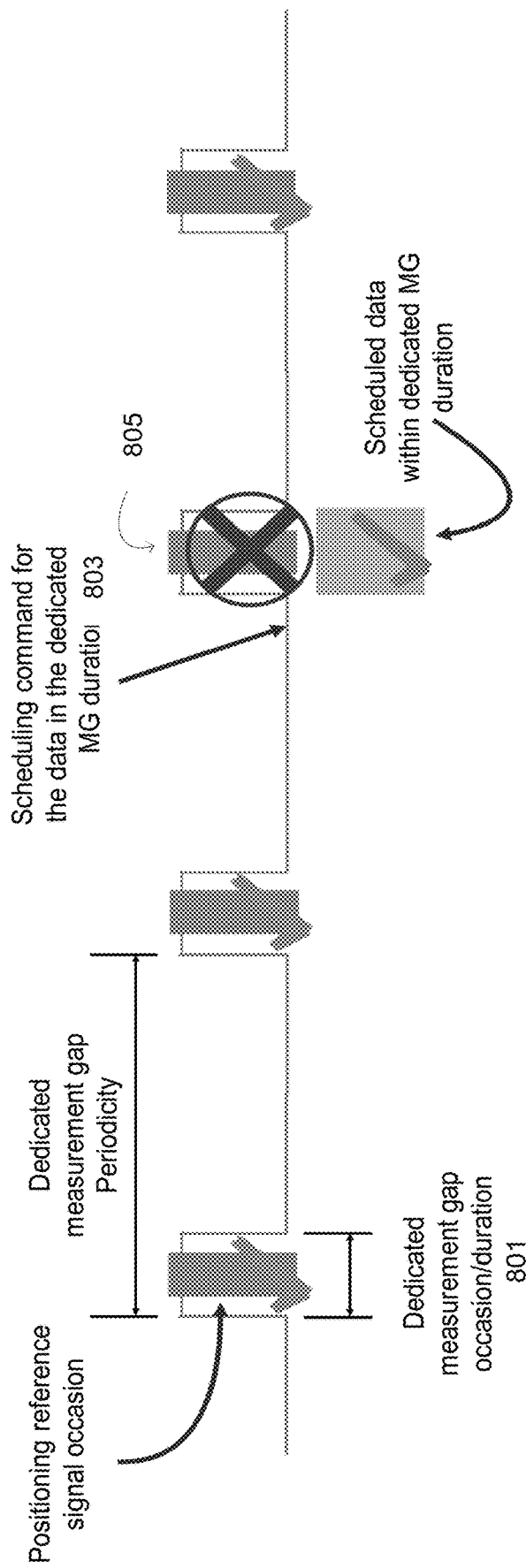
FIG. 8 illustrates a method for the UE to use dedicated measurement gaps for positioning measurements and for the UE for skip the positioning measurement when scheduled data collides with a dedicated measurement gap in accordance to some embodiments of the disclosure.

FIG. 8 illustrates a method for the UE to use dedicated measurement gaps for positioning measurements and for the UE to skip the positioning measurement when scheduled data collides with a dedicated measurement gap according to some embodiments of the disclosure. In one embodiment, if the dedicated measurement gap collides with a legacy measurement gap used for mobility measurement, the mobility measurement may be prioritized unless the mobility measurement and the positioning measurement could be conducted in parallel based on UE capability. In one embodiment, the dedicated measurement gap collides with a legacy measurement gap used for measurement when the time and frequency domain resource elements (RE) or resource blocks of the target PRS collide with those used for the mobility measurement.

In one embodiment, the dedicated measurement gaps for positioning measurement may be labelled to differentiate the dedicated measurement gaps from other legacy measurement gaps used for mobility measurement. For example, during the measurement gap configuration, an indication of purpose may be associated with either the positioning measurement, the mobility measurement, or others. By default, the UE may perform the positioning measurement within these dedicated positioning measurement gaps. In one embodiment, if data or sounding reference signal (SRS) is scheduled by the serving gNB within one of these dedicated positioning measurement gaps, the UE may automatically mute the dedicated positioning measurement gap that collides with the scheduled data/SRS. Thus, the UE may prioritize data/SRS over the positioning measurement within these dedicated positioning measurement gaps that collide with the scheduled data/SRS. The scheduling command from the serving gNB may be sent to the UE before the start of the dedicated measurement gap encompassing the PRS occasion and the UE may skip the positioning measurement in the corresponding dedicated measurement gap where date or SRS is scheduled.

In FIG. 8, the UE may request dedicated measurement gaps for positioning measurements and the serving gNB may configure dedicated measurement gaps on the UE with the purpose indication of "for positioning measurement." The UE may perform the positioning measurement within the dedicated measurement gap durations or occasions 801 encompassing the PRS occasion. The dedicated measurement gaps may repeat with a periodicity. If the UE receives a scheduling command for the data or SRS prior to the start of a dedicated measurement gap duration 805 such as at time instant 803, the UE may skip positioning measurement in that dedicated measurement gap duration 805 and the scheduled data/SRS may be prioritized in the dedicated measurement duration 805. If the serving gNB sends the scheduling command for the data/SRS within the dedicated measurement gap duration, such as after the dedicated measurement gap duration has started or when there is insufficient time for the UE to prioritize the scheduled data/SRS over the positioning measurement, the UE may continue with the positioning measurement in the dedicated measurement gap duration.

Figure 9:
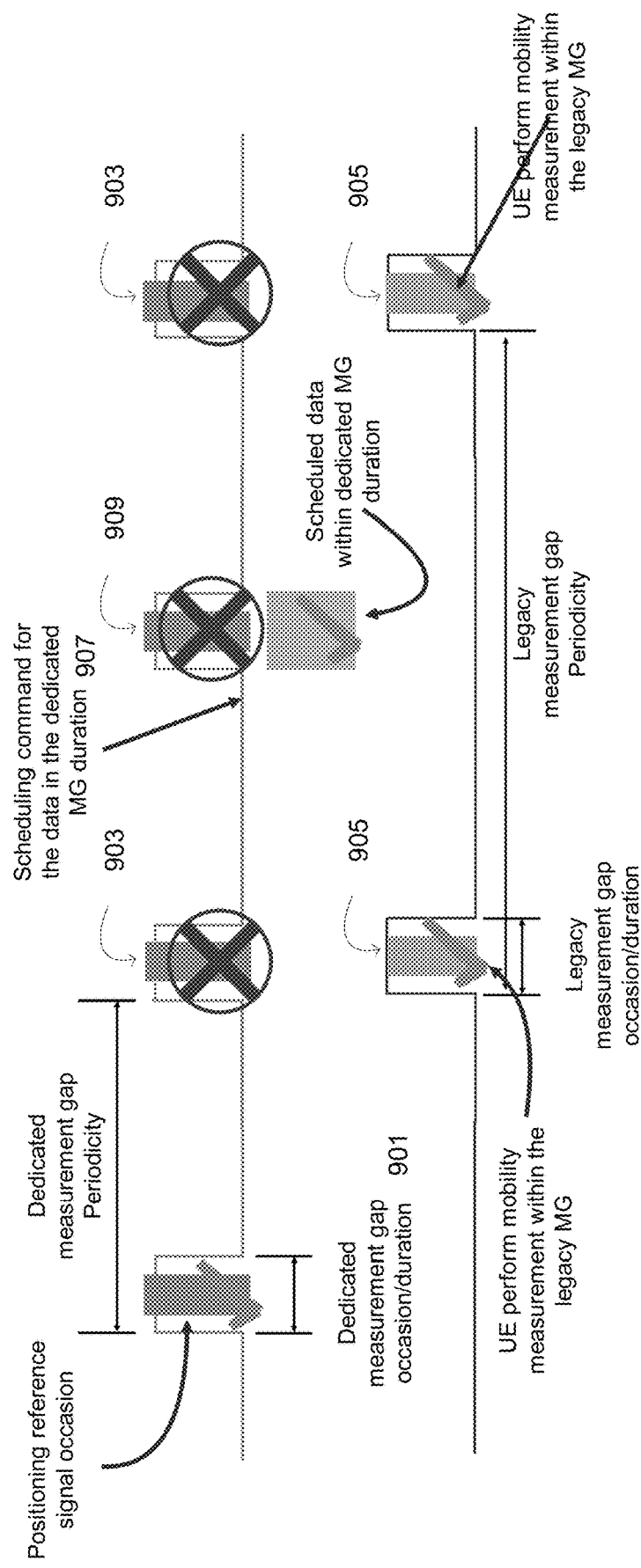
FIG. 9 illustrates a method for the UE to use dedicated measurement gaps for positioning measurements and for the UE for skip the positioning measurement when legacy measurement gaps for mobility measurement collide with dedicated measurement gaps in accordance to some embodiments of the disclosure.

FIG. 9 illustrates a method for the UE to use dedicated measurement gaps for positioning measurements and for the UE for skip the positioning measurement when legacy measurement gaps for mobility measurement collide with dedicated measurement gaps according some embodiments of the disclosure. For example, if a dedicated measurement gap for positioning measurement collides with a legacy measurement gap used for mobility measurement, the UE may prioritize the mobility measurement over the positioning measurement if the mobility measurement and the positioning measurement cannot be performed in parallel based on UE capability.

In FIG. 9, the UE may request dedicated measurement gaps for positioning measurements and the serving gNB may configure dedicated measurement gaps as in FIG. 8. The UE may perform the positioning measurement within the dedicated measurement gap duration 901. The dedicated measurement gaps may repeat with a periodicity. If a dedicated measurement gap 903 for positioning measurement collides with a legacy measurement gap 905 for mobility measurement, the UE may skip the positioning measurement in that dedicated measurement gap duration 903 and the UE may perform the mobility measurement in the colliding legacy measurement gap 905 instead if the UE cannot perform the mobility measurement and the positioning measurement in parallel. The legacy measurement gap may repeat with its periodicity. In one embodiment, the periodicity of the legacy measurement gaps may be a multiple of the periodicity of the dedicated measurement gaps. FIG. 9 shows a second collision of the dedicated measurement gap 903 and the legacy measurement gap 905 and again the mobility measurement is prioritized over the positioning measurement. FIG. 9 also shows that if the UE receives a scheduling command for the data or SRS prior to the start of a dedicated measurement gap duration 909 such as at time instant 907, the UE may skip positioning measurement in that dedicated measurement gap duration 909 and the scheduled data/SRS may be prioritized in the dedicated measurement duration 909. In one embodiment, the UE may prioritize the data/SRS over the mobility measurement if the scheduled data/SRS collides with the dedicated measurement gap and with the legacy measurement gap.

In one embodiment, based on the current status of the active BWP and target PRS, the UE may request activation or deactivation of measurement gaps from the serving gNB for positioning measurements. The UE may request measurement gaps for positioning measurement with a status indication of "activated" or "deactivated" for the measurement gaps. In one embodiment, the UE may request the activation or deactivation of the measurement gaps using PHY signaling or MAC CE signaling. For example, If the active BWP does not contain the target PRS, the UE may request activation of the measurement gaps. The UE may use the measurement gaps to measure the target PRS. If the serving gNB switches the active BWP and the new active BWP contains the target PRS, the UE may request deactivation of the measurement gaps. The measurement gaps configured for the UE may then be muted and the UE may measure the target PRS without using the measurement gaps.

Figure 10:
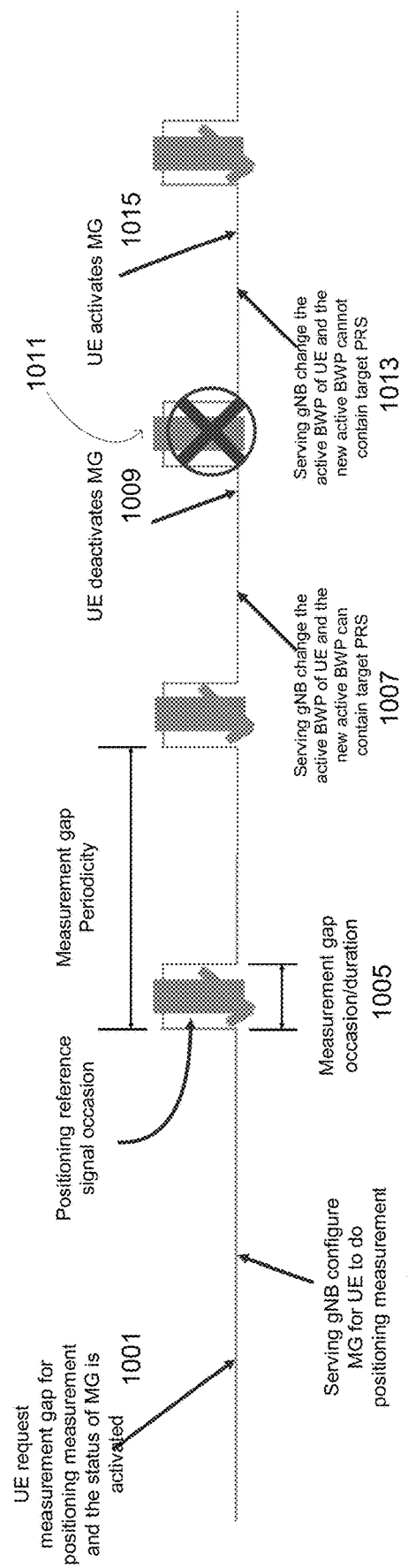
FIG. 10 illustrates a method for the UE to request measurement gaps to the serving base station for positioning measurements and for the UE to activate and deactivate the measurement gaps when the serving base station changes the active BWP in accordance to some embodiments of the disclosure.

FIG. 10 illustrates a method for the UE to request measurement gaps to the serving base station for positioning measurements and for the UE to activate and deactivate the measurement gaps when the serving base station changes the active BWP according to some embodiments of the disclosure. At time instant 1001, the UE may requests measurement gaps for positioning measurement and may indicate that the status of the measurement gaps is activated, e.g., because the active BWP of the UE does not contain the target PRS. At time instant 1003, the serving gNB may configure corresponding measurement gaps to the UE and may expect UE to use the measurement gaps to perform the positioning measurements. The serving gNB may not schedule any data within these measurement gap durations 1005.

At time instant 1007, if the serving gNB changes the active BWP of UE and the new active BWP contains the target PRS, then the UE may deactivate the measurement gaps at time instant 1009 and the following measurement gaps 1011 will be muted for the UE to receive the target PRS to perform positioning measurement until the UE activates the measurement gaps again. At time instant 1013, the serving gNB changes the active BWP of the UE and the new active BWP does not contain the target PRS again, the UE may activate the measurement gaps at time instant 1015 and the following measurement gaps will be available again for the UE to receive the target PRS to perform positioning measurement until the UE deactivates the measurement gaps.

In one embodiment, the UE may provide PRS information to the serving gNB for the serving gNB to activate or deactivate the measurement gaps for the UE. In one embodiment, the PRS information may include the PRS time/frequency information, such as the frequency domain RE or resource blocks of the target PRS, to the serving gNB. In one embodiment, the PRS time/frequency information may be derived from assistance data received by the UE from a positioning server. The serving gNB may activate or deactivate the measurement gaps for the UE. In one embodiment, the serving gNB may use the RRC configuration of measurement gap pattern network to indicate the measurement gap status to the UE. In one embodiment, the serving gNB may indicate the activation or deactivation of the measurement gaps to the UE using PHY signaling or MAC CE signaling.

After configuring the measurement gaps on the UE, the serving gNB may decide whether to activate or deactivate the measurement gaps based on the status of the active BWP. If the active BWP does not contain the target PRS, the serving gNB may activate the measurement gaps. The UE may use the measurement gaps to receive the target PRS. If the serving gNB switches the active BWP and the new active BWP contains the target PRS, the serving gNB may deactivate the measurement gaps. The measurement gaps configured for the UE may be muted and the UE may receive the target PRS without the measurement gaps.

In one embodiment, the serving gNB may activate or deactivate the measurement gaps using one of the signaling below:

```
Option 1:
MeasGapConfig ::=       SEQUENCE {
        gapFR2          SetupRelease { GapConfig }
        ...,
        [[
        gapFR1          SetupRelease { GapConfig }
        gapUE           SetupRelease { GapConfig }
        ]]
        activation-Status   ENUMERATED {true} (new signaling, to indicate the
                        measurement gap is activated or not)
}
Option 2:
GapConfig ::=           SEQUENCE {
        gapOffset       INTEGER (0..159),
        mgl             ENUMERATED {ms1dot5, ms3, ms3dot5, ms4, ms5dot5,
ms6},
        mgrp            ENUMERATED {ms20, ms40, ms 80, ms 160},
        mgta            ENUMERATED {ms0, ms0dot25, ms0dot5},
        ...,
        [[
        refServCellIndicator    ENUMERATED {pCell, pSCell, mcg-FR2}
                        OPTIONAL -- Cond NEDCorNRDC
        ]]
        activation-Status   ENUMERATED {true} (new signaling, to indicate the
        measurement gap is activated or not)
}
Option 3:
MeasGapConfig ::=       SEQUENCE {
        gapFR2          SetupRelease { GapConfig }
            OPTIONAL, -- Need M
        ...,
        [[
        gapFR1          SetupRelease { GapConfig }
            OPTIONAL, -- Need M
        gapUE           SetupRelease { GapConfig }
            OPTIONAL -- Need M
        ]]
        MeaswithoutMG   ENUMERATED {true}
        (new signaling, to indicate if measurement can be performed without MG or not)
}
Option 4:
GapConfig ::=           SEQUENCE {
        gapOffset       INTEGER (0..159),
        mgl             ENUMERATED {ms1dot5, ms3, ms3dot5, ms4, ms5dot5,
                ms6},
        mgrp            ENUMERATED {ms20, ms40, ms80, ms160},
        mgta            ENUMERATED {ms0, ms0dot25, ms0dot5},
        ...,
        [[
        refServCellIndicator        ENUMERATED {pCell, pSCell, mcg-FR2}
                        OPTIONAL -- Cond NEDCorNRDC
        ]]
        MeaswithoutMG   ENUMERATED {true}
        (new signaling, to indicate if measurement can be performed without MG or not)
}
```

Figure 11:
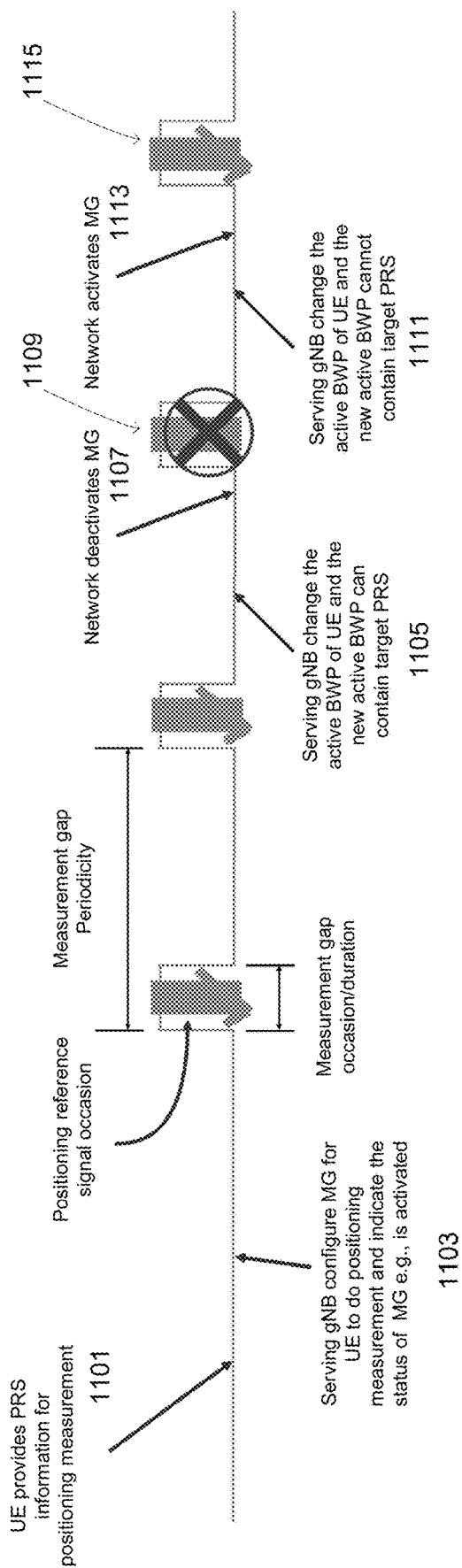
FIG. 11 illustrates a method for the UE to provide PRS information to the serving base station for the serving base station to activate and deactivate the measurement gaps when the serving base station changes the active BWP in accordance to some embodiments of the disclosure.

FIG. 11 illustrates a method for the UE to provide PRS information to the serving base station for the serving base station to activate and deactivate the measurement gaps when the serving base station changes the active BWP according to some embodiments of the disclosure. At time instant 1101, the UE may provide PRS information for positioning measurement to the serving gNB. At time instant 1103, based on current BWP and the PRS information, the serving gNB may configure corresponding measurement gaps to the UE, and may also indicate if the measurement gaps are activated or deactivated. At time instant 1105, if the serving gNB changes the active BWP of the UE and the new active BWP contains the target PRS, then serving gNB may deactivate measurement gaps at instant 1107 and the following measurement gaps 1109 will be muted until the serving gNB activates the measurement gaps again. At time instant 1111, the serving gNB changes the active BWP of the UE and the new active BWP does not contain the target PRS again, then the serving gNB may activate the measurement gaps at time instant 1113, and the following measurement gaps 1115 will be available again for the UE until the serving gNB deactivates the measurement gaps.

In one embodiment, the UE may provide PRS information to the serving gNB via RRC. The serving gNB may have internal information exchange between PHY/MAC and RRC to decide whether or not the current active BWP of the target UE can contain PRS for its positioning measurements. The serving gNB may perform an initial measurement gap configuration for positioning measurements using the target PRS regardless of whether the active BWP contains the target PRS. After the initial configuration, the serving gNB may check if the active BWP contains the target PRS to determine whether to expect the UE to use the measurement gaps for positioning measurements. For example, if the active BWP contains the target PRS, the serving gNB may not expect the UE will use the measurement gaps for positioning measurements. If the active BWP does not contain the target PRS, the serving gNB may expect the UE to use the measurement gaps to receive the target PRS.

The UE may independently evaluate if the BWP contains the target PRS to determine whether to use the measurement gaps for positioning measurements. For example, if the active BWP contains the target PRS, the UE may not use the measurement gaps for positioning measurements. If the active BWP does not contain the target PRS, the UE may use the measurement gaps to receive the target PRS.

Figure 12:
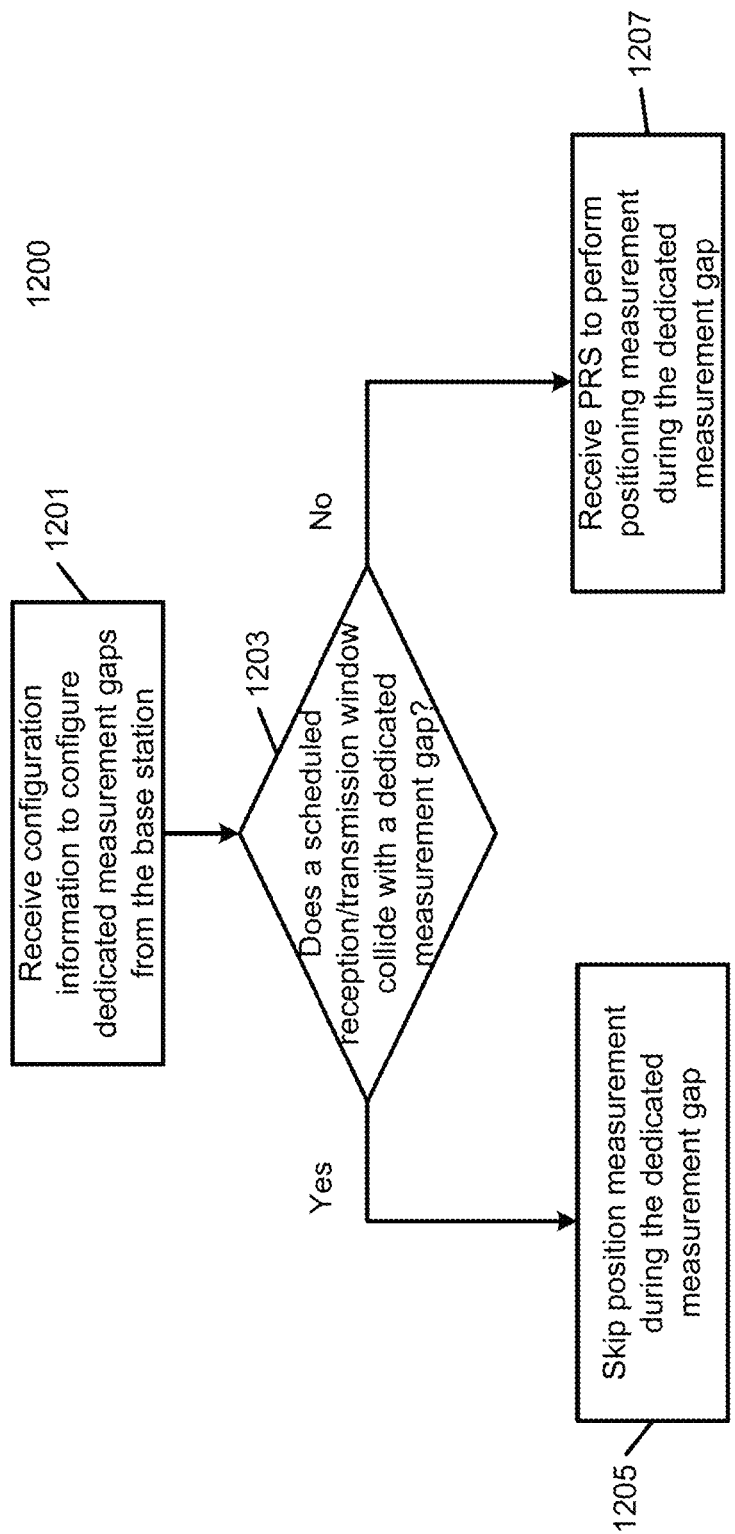
FIG. 12 is a flow diagram illustrating an example of a method for a UE to use dedicated measurement gaps for positioning measurements in accordance to some embodiments of the disclosure.

FIG. 12 is a flow diagram illustrating an example of a method 1200 for a UE to use dedicated measurement gaps for positioning measurements in accordance to some embodiments of the disclosure. Method 1200 may be performed by processing logic which may include software, hardware, or a combination thereof. For example, method 1200 may be performed by processors 302 or cellular communication circuitry 330 of the UE 106, such as described in conjunction with FIGS. 1, 2, 3, and 5.

At operation 1201, the UE receives configuration information from the serving base station, such as a serving gNB, to configure measurement gaps dedicated for the positioning measurements. The dedicated positioning measurements may be labelled to differentiate them from other legacy measurement gaps used for mobility measurement. The dedicated positioning measurement gaps may repeat with a periodicity.

At operation 1203, the UE determines if a scheduled reception window or a scheduled transmission window collides with one of the dedicated measurement gaps. The scheduled reception window may be a legacy measurement gap used for mobility measurement. The scheduled transmission window may be a transmission of data or SRS scheduled by the serving base station.

At operation 1205, the UE skips the positioning measurements during one of the dedicated measurement gap if there is a collision between the scheduled reception window or the scheduled transmission window with the dedicated measurement gap. The scheduled reception or the scheduled transmission is prioritized over the positioning measurement during the dedicated measurement gap if there is a collision.

At operation 1207, the UE receives target PRS to perform the positioning measurement during one of the dedicated measurement gap if there is no collision between the scheduled reception window and the scheduled transmission window with the dedicated measurement gap.

Figure 13:
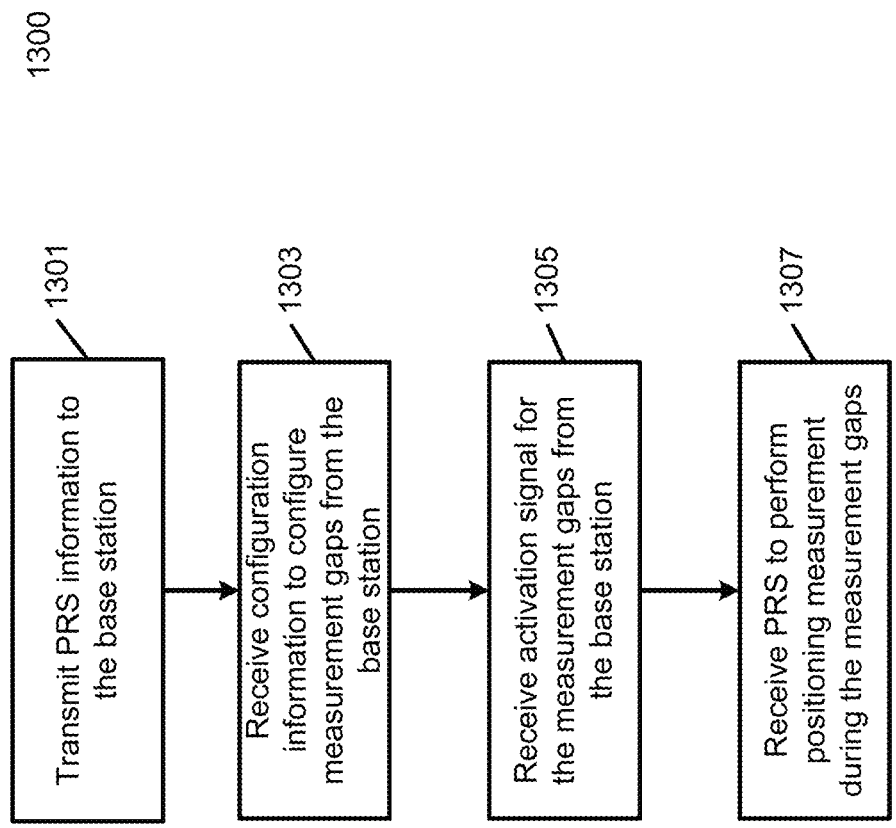
FIG. 13 is a flow diagram illustrating an example of a method for a UE to provide PRS information to the serving base station and for the UE to be configured and activated by the serving base station to use measurement gaps for positioning measurements in accordance with some embodiments of the disclosure.

FIG. 13 is a flow diagram illustrating an example of a method 1300 for a UE to provide PRS information to the serving base station and for the UE to be configured and activated by the serving base station to use measurement gaps for positioning measurements in accordance with some embodiments of the disclosure. Method 1300 may be performed by processing logic which may include software, hardware, or a combination thereof. For example, method 1300 may be performed by processors 302 or cellular communication circuitry 330 of the UE 106, such as described in conjunction with FIGS. 1, 2, 3, and 5.

At operation 1301, the UE transmits information about the target PRS to the serving base station, such as a serving gNB. In one embodiment, the information about the target PRS may include the PRS time/frequency information, such as the frequency domain RE or resource blocks of the target PRS.

At operation 1303, the UE receives configuration information from the serving base station to configure measurement gaps for the positioning measurements. The serving base station may not schedule any data within the measurement gaps.

At operation 1305, the UE receives an activation signal for the measurement gaps from the serving base station. The UE may receive the activation signal when the serving base station determines that the active BWP does not contain the target PRS based on the PRS information received from the UE. In one embodiment, the UE may receive a deactivation signal for the measurement gaps when the serving base station determines that the active BWP contains the target PRS.

At operation 1307, the UE receives target PRS to perform the positioning measurement during the measurement gaps in response to receiving the activation signal.

Figure 14:
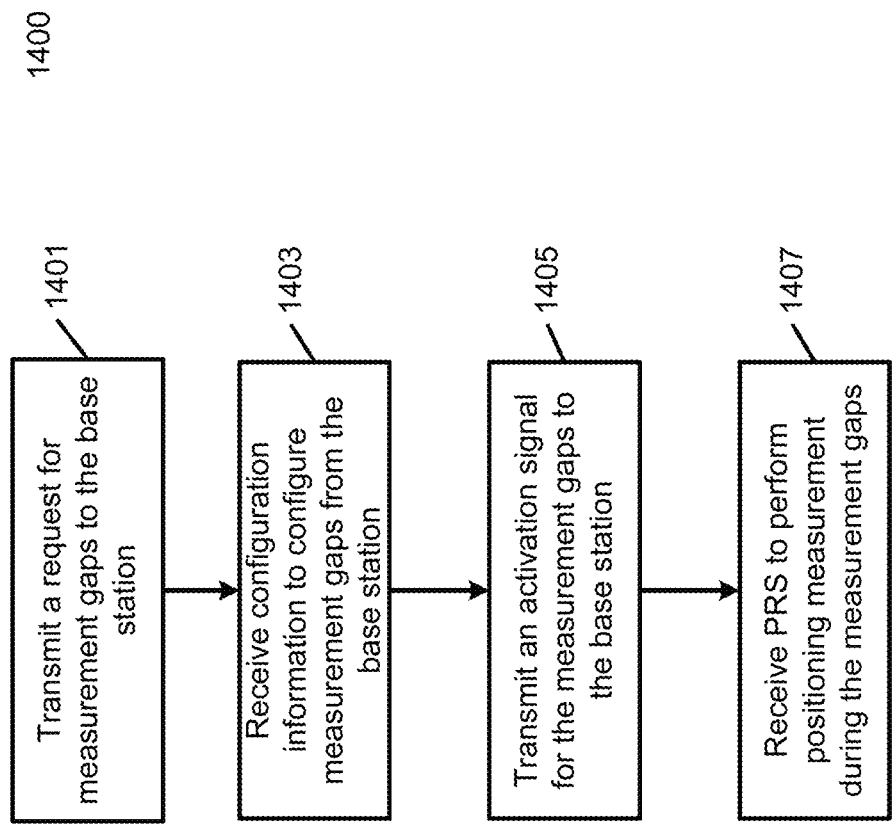
FIG. 14 is a flow diagram illustrating an example of a method for a UE to be configured with measurement gaps by the serving base station and for the UE to activate the measurement gaps for positioning measurements in accordance with some embodiments of the disclosure.

FIG. 14 is a flow diagram illustrating an example of a method 1400 for a UE to be configured with measurement gaps by the serving base station and for the UE to activate the measurement gaps for positioning measurements in accordance with some embodiments of the disclosure. Method 1400 may be performed by processing logic which may include software, hardware, or a combination thereof. For example, method 1400 may be performed by processors 302 or cellular communication circuitry 330 of the UE 106, such as described in conjunction with FIGS. 1, 2, 3, and 5.

At operation 1401, the UE transmits a request for measurement gaps to the serving base station, such as a serving gNB.

At operation 1403, the UE receives configuration information from the serving base station to configure measurement gaps for the positioning measurements. The serving base station may not schedule any data within the measurement gaps.

At operation 1405, the UE transmits to the serving base station an activation signal for the measurement gaps. The UE may transmit the activation signal when the active BWP does not contain the target PRS. In one embodiment, the UE may transmit a deactivation signal for the measurement gaps to the base station when the active BWP contains the target PRS. The UE may then mute the measurement gaps for the positioning measurements when the positioning measurements are deactivated.

At operation 1407, the UE receives target PRS to perform the positioning measurement during the measurement gaps after the UE transmits the activation signal for the measurement gaps.

Embodiments of the method and apparatus described herein for supporting reduced capability devices in a wireless network may be implemented in a data processing system, for example, by a network computer, network server, tablet computer, smartphone, laptop computer, desktop computer, other consumer electronic devices or other data processing systems. In particular, the operations described are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of performing a positioning measurement by a wireless device, the method comprising:
receiving, by the wireless device from a base station of a wireless communication network, configuration information to configure a plurality of first measurement gaps dedicated for the positioning measurement;
determining, by the wireless device, if a scheduled reception window or a scheduled transmission window collides with one of the plurality of first measurement gaps;
skipping, by the wireless device, the positioning measurement during one first measurement gap of the plurality of first measurement gaps, in response to determining there is a collision between the scheduled reception window or the scheduled transmission window with the one first measurement gap; and
receiving, by the wireless device, a positioning reference signal to perform the positioning measurement during the one first measurement gap in response to determining there is no collision between the scheduled reception window and the scheduled transmission window with the one first measurement gap.

2. The method of claim 1, wherein the scheduled reception window comprises a second measurement gap used for a mobility measurement, and wherein skipping by the wireless device the positioning measurement during the one first measurement gap comprises performing by the wireless device the mobility measurement during the second measurement gap.

3. The method of claim 1, wherein the scheduled transmission window comprises a window for transmitting data or a reference signal, and wherein skipping by the wireless device the positioning measurement during the one first measurement gap
comprises transmitting by the wireless device the data or the reference signal to the base station during the scheduled transmission window.

4. The method of claim 3, wherein determining by the wireless device that the scheduled transmission window collides with the one first measurement gap comprises receiving, prior to a start of the one first measurement gap, a scheduling command from the base station to transmit the data or the reference signal during the one first measurement gap.

5. A method of performing a positioning measurement by a wireless device, the method comprising:
transmitting, by the wireless device, information about a positioning reference signal to a base station of a wireless communication network;
receiving, by the wireless device from the base station, configuration information to configure a plurality of measurement gaps for the positioning measurement;
receiving, by the wireless device from the base station, an activation signal for the plurality of measurement gaps;
receiving, by the wireless device, the positioning reference signal to perform the positioning measurement during the plurality of measurement gaps in response to receiving the activation signal;
receiving, by the wireless device from the base station, a deactivation signal for the plurality of measurement gaps;
muting the plurality of measurement gaps; and
receiving, by the wireless device, the positioning reference signal to perform the positioning measurement without using the plurality of measurement gaps in response to receiving the deactivation signal.

6. The method of claim 5, wherein the activation signal indicates that a frequency layer used for communicating between the wireless device and the base station does not contain a frequency resource used for the positioning reference signal.

7. The method of claim 5, wherein the deactivation signal indicates that a frequency layer used for communicating between the wireless device and the base station contains a frequency resource used for the positioning reference signal.

8. A wireless device, comprising: at least one antenna;
at least one radio, wherein the at least one radio is configured to communicate with a base station of a wireless communication network using the at least one antenna; and
at least one processor coupled to the at least one radio, wherein the at least one processor is configured to perform operations comprising:
receive from the base station configuration information to configure a plurality of first measurement gaps dedicated for a positioning measurement;
determine if a scheduled reception window or a scheduled transmission window collides with one of the plurality of first measurement gaps;
skip the positioning measurement during one first measurement gap of the plurality of first measurement gaps, in response to a determination there is a collision between the scheduled reception window or the scheduled transmission window with the one first measurement gap; and
receive a positioning reference signal to perform the positioning measurement during the one first measurement gap in response to a determination there is no collision between the scheduled reception window and the scheduled transmission window with the one first measurement gap.

9. The wireless device of claim 8, wherein the scheduled reception window comprises a second measurement gap used for a mobility measurement, and wherein the operation to skip the positioning measurement during the one first measurement gap comprises an operation to perform the mobility measurement during the second measurement gap.

10. The wireless device of claim 8, wherein the scheduled transmission window comprises a window used to transmit data or a reference signal, and wherein the operation to skip the positioning measurement during the one first measurement gap comprises an operation to transmit the data or the reference signal to the base station during the scheduled transmission window.

11. The wireless device of claim 10, wherein the operation to determine that the scheduled transmission window collides with the one first measurement gap comprises an operation to receive, prior to a start of the one first measurement gap, a scheduling command from the base station to transmit the data or the reference signal during the one first measurement gap.

12. A wireless device, comprising: at least one antenna;
at least one radio, wherein the at least one radio is configured to communicate with a base station of a wireless communication network using the at least one antenna; and
at least one processor coupled to the at least one radio, wherein the at least one processor is configured to perform operations comprising:
transmit information about a positioning reference signal to the base station;
receive from the base station configuration information to configure a plurality of measurement gaps for a positioning measurement;
receive from the base station an activation signal for the plurality of measurement gaps;
receive the positioning reference signal to perform the positioning measurement during the plurality of measurement gaps in response to receiving the activation signal;
receive from the base station a deactivation signal for the plurality of measurement gaps;
mute the plurality of measurement gaps; and
receive the positioning reference signal to perform the positioning measurement without using the plurality of measurement gaps in response to receiving the deactivation signal.

13. The wireless device of claim 12, wherein the activation signal indicates that a frequency layer used for communicating between the wireless device and the base station does not contain a frequency resource used for the positioning reference signal.

14. The wireless device of claim 12, wherein the deactivation signal indicates that a frequency layer used for communicating between the wireless device and the base station contains a frequency resource used for the positioning reference signal.

15. A wireless device, comprising:
at least one antenna;
at least one radio, wherein the at least one radio is configured to communicate with a base station of a wireless communication network using the at least one antenna; and
at least one processor coupled to the at least one radio, wherein the at least one processor is configured to perform operations comprising:
transmit to the base station a request for a plurality of measurement gaps for a positioning measurement;
receive from the base station configuration information to configure the plurality of measurement gaps for the positioning measurement;
transmit to the base station an activation signal for the plurality of measurement gaps; and
receive a positioning reference signal to perform the positioning measurement during the plurality of measurement gaps.

16. The wireless device of claim 15, wherein the operation to transmit to the base station the activation signal comprises an operation to determine that a frequency layer used for communicating between the wireless device and the base station does not contain a frequency resource used for the positioning reference signal.

17. The wireless device of claim 15, wherein the at least one processor is configured to further perform operations comprising:
transmit to the base station a deactivation signal for the plurality of measurement gaps;
mute the plurality of measurement gaps; and
receive the positioning reference signal to perform the positioning measurement without using the plurality of measurement gaps.

18. The wireless device of claim 17, wherein the operation to transmit to the base station the deactivation signal comprises an operation to determine that a frequency layer used for communicating between the wireless device and the base station contains a frequency resource used for the positioning reference signal.

* * * * *